July 14, 1959  H. C. NICHOLLS  2,894,671
PALLETIZED CONTAINER
Filed Jan. 26, 1956  2 Sheets-Sheet 1
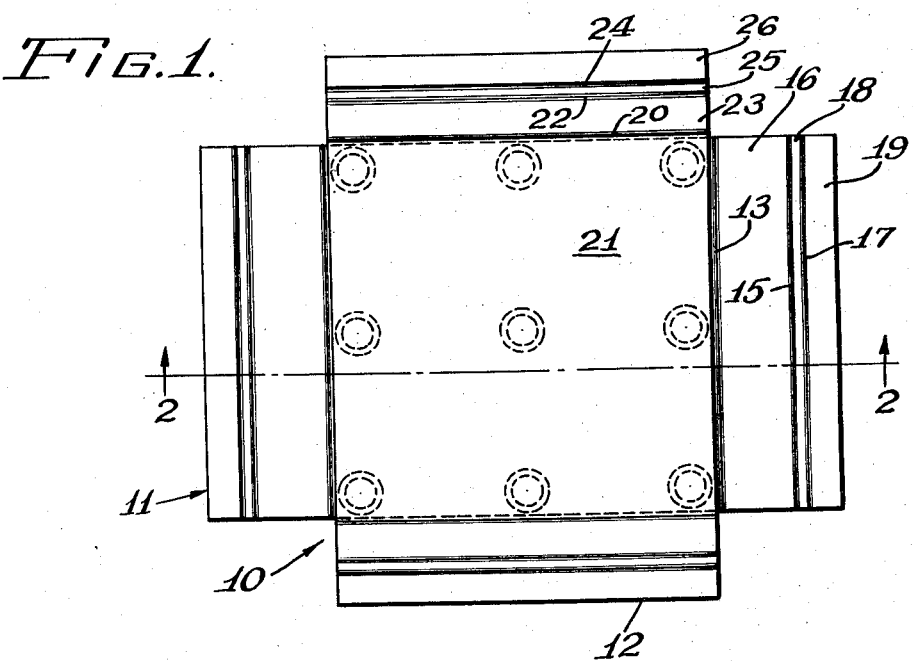
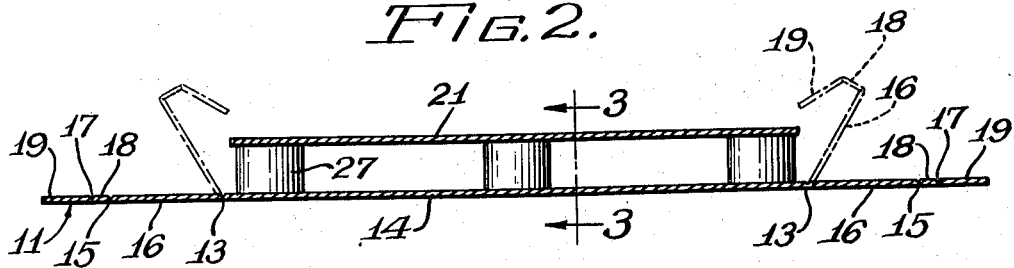
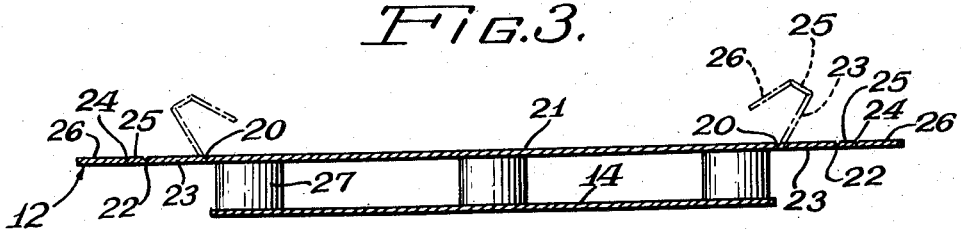
Inventor:
Herbert C. Nicholls
By Gary, Desmond & Parker
Attys.

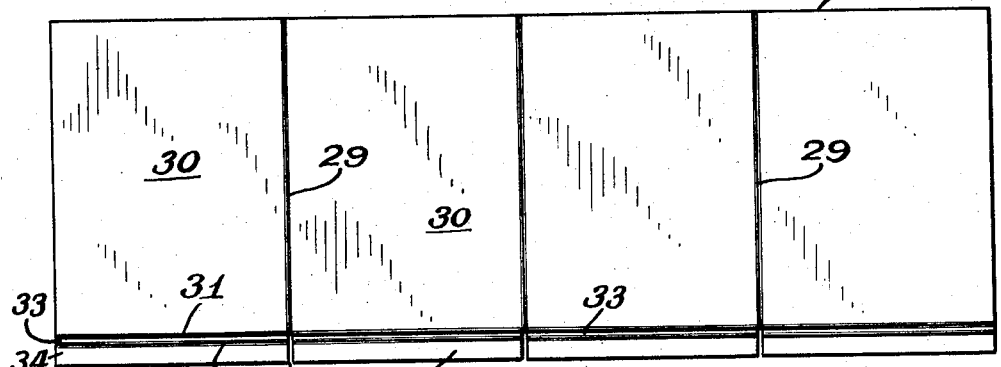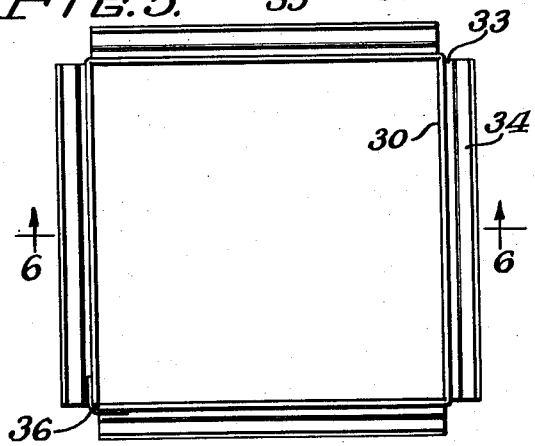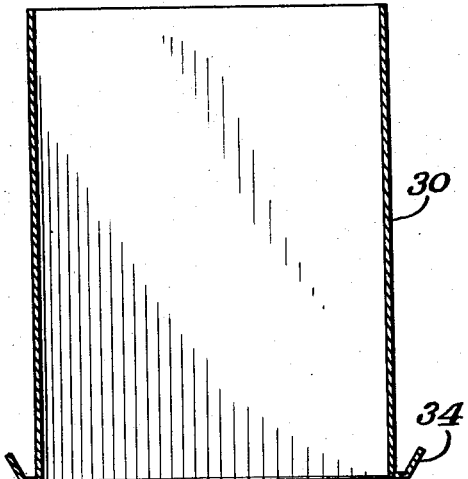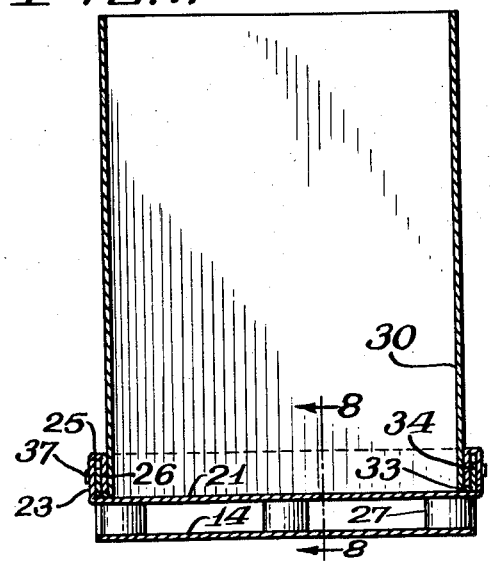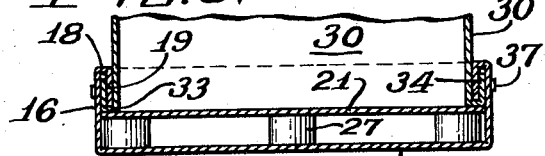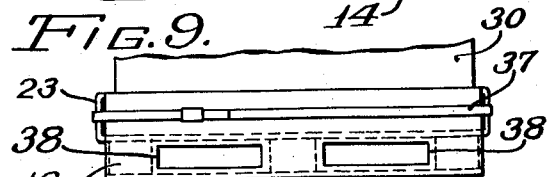

2,894,671
Patented July 14, 1959

2,894,671
PALLETIZED CONTAINER

Herbert C. Nicholls, Wisconsin Rapids, Wis., assignor to Consolidated Water Power & Paper Co., Wisconsin Rapids, Wis., a corporation of Wisconsin Application January 26, 1956, Serial No. 561,526

3 Claims. (Cl. 229—14)

This invention relates to the production of a novel container adapted to be handled on a lift truck.

It is an object of the present invention to provide a composite structure comprised of a container or receptacle component and a pallet or skid component adapted to receive the forks of a conventional life truck for transportation thereby, each of the said components being essentially composed of paperboard, such as corrugated or solid board, in a sturdy structure of an expendable character.

It is a further object of the present invention to provide an assembly characterized by novel interengagement or interlocking means on the pallet and container components joining them into a mutually reinforcing, unitary, strong and rugged structure.

The foregoing and other objects and advantages of the present invention, together with its details of construction and arrangement of parts, will be apparent from a consideration of the following specification and accompanying drawings, wherein:

Fig. 1 is a plan view of the pallet component of the present invention prior to its engagement with the container component thereof.

Fig. 2 is an enlarged section on the line 2—2 of Fig. 1.

Fig. 3 is a section on the line 3—3 of Fig. 2.

Fig. 4 is a blank development of the container components of the present invention.

Fig. 5 is a plan view of the container component of the present invention formed from the blank shown in Fig. 4.

Fig. 6 is a section on the line 6—6 of Fig. 5.

Fig. 7 is a vertical section through the assembly of the pallet and container components of the present invention.

Fig. 8 is a section on the line 8—8 of Fig. 7.

Fig. 9 is a fragmentary front elevational view of the lower portion of the assembly of Fig. 7.

Referring to the drawings, the reference numeral 10 generally designates the pallet or skid portion of the present invention comprised of two paperboard components designated as 11 and 12 respectively, scored and adapted to be folded as illustrated by the dotted positions of Figs. 2 and 3. Thus, fiberboard sheet 11 is scored on the lines 13—13 to define a rectangular center panel 14, on the lines 15—15 to define a pair of side wall panels 16—16, and on the lines 17—17 to define interlocking terminal panels 18—18 and 19—19 respectively. The fiberboard sheet 12 is similarly provided with score lines 20—20 to define between them a rectangular panel 21; score lines 22—22 to define side walls 23—23; and score lines 24—24 to define terminal end panels 25—25 and 26—26 respectively.

These two sheets 11 and 12 are arranged at right angles to each other with their respective center panels in juxtaposition, and the spacing members 27 disposed and adhesively joined between them. These spacing or supporting members 27 are in the form of short sections adequate to hold the opposed surfacing panels 14 and 21 spaced apart a distance adequate for the reception of the forks of a lift truck. These supporting sections 27 may be in the form of wound paper tubes suitably cut from waste cores; or, in the alternative, although not shown, the support members may be composed of built-up sections of corrugated board with the corrugations running normal to the surfaces between which the members are interposed.

As indicated in Fig. 1, the support members 27 are spaced so that they present clear paths for entry of the forks of a lift truck from any of the four sides of the pallet. Although nine members 27 are shown disposed in the pattern illustrated in Fig. 1 so as to provide good distribution and support for the load which the pallet is to carry, other arrangements or patterns may be made, as from a simple one of one support at each of the four corners, to any greater number, as is well known in the art.

The container component of the present invention, as illustrated in Fig. 4, may be composed of a single blank generally designated as 28, cut and scored as, for example, by means of transverse score lines 29 to form the four panels 30, and further longitudinally scored as at 31 and 32 to provide interlocking flap components 33 and 34 at the bottom of each of the panels 30 and separated thereat by the dividing slots 35. Although not shown, it will be understood that the container may be provided with top closure flaps or telescopic cover. The blank 28 is then folded so that the two terminal panels are brought into meeting engagement and joined together as, for example, by means of a tape 36 adhesively or otherwise secured to form a rectangular container, as shown in Fig. 5. The respective flaps 33 and 34 depending from the panels 30 are then folded outwardly with the outermost panels 34 bent upwardly, as shown in Fig. 6, and then interlocked with the pallet 10, as shown in Fig. 7.

As will appear from Fig. 7, the dimension of the resulting container is such that it is slightly less than that of the pallet 10 so that it may be supported thereon. It will be further noted that the flaps 34 at the bottom of the container component are embraced by the components extending laterally of the center pallet panels 14 and 21 respectively, and that the side wall panels 16 are longer than the corresponding panels 23 by the height of the spacing elements 27. Thus, one opposed pair of container panels 34 is embraced by one opposed pair of pallet panels 16, 18 and 19, and the other opposed pair of container panels 30 by the other opposed pair of pallet panels 23, 25 and 26. The respective terminal flaps or panels after being enveloped, as shown in Figs. 7 and 8, are secured together by means of a steel band or the like 37 to hold the pallet and container components in a firm interlocked assembly.

As is further apparent, the pallet component presents a free path for the forks of a lift truck from two opposed sides thereof; whereas the other two opposed sides are enclosed by the side panels 16—16 which extend upwardly from the base facing panel 14. The component materials of which the pallet is formed, i.e., corrugated board, being a rupturable material, permits ingress therethrough, as by rupture by the forks of a lift truck when so desired, and a path, or a designated path, may be provided in either one of two ways. Thus, for example, the blank 11 may be formed with elongated apertures in its side wall components 16—16 so that when folded into the assembly illustrated as, for example, in Fig. 9, rectangular or otherwise shaped openings 38—38 may be presented. On the other hand, instead of preforming these openings 38—38, in lieu thereof the corresponding areas may be ruptured after assembly, and at any time when ingress through the then normally imperforate walls is desired. For this purpose the area to be ruptured may be indicated on the walls 16—16 as by imprinting with indicia to designate a target for the forks of a lift truck.

It will be understood that although I have shown and illustrated the preferred form of my invention, various modifications may be made in the details thereof without departing from its spirit, as comprehended by the following claims:

I claim:

1. In a palletized container, a pallet component comprising a pair of paperboard rectangular facing panels and a plurality of load supporting members disposed and secured between said panels and arranged for lift truck fork entry therebetween in paths at right angles to each other, a rectangular tubular paperboard container component supported on said pallet, and means interengaging said components comprising flaps in hinged engagement with the lower edges of said rectangular tube return folded against the outer faces thereof, flaps in hinged engagement with opposed edges of the upper pallet facing panel folded upwardly therefrom in embracing relationship with an opposed pair of container panels, and flaps in hinged engagement with opposed edges of the lower pallet facing panel folded upwardly therefrom in embracing engagement with the other opposed pair of container panels.

2. The device of claim 1 wherein the flaps extending upwardly from the lower pallet facing panel are each contiguous with a row of spaced supports and the areas of said panels between the supports are formed with apertures for lift truck fork reception.

3. The device of claim 1 wherein the flaps extending upwardly from the lower pallet facing panel are each contiguous with a row of spaced supports and normally imperforate, and the areas of said panels between the suports include indicia inscribed on their outer surfaces designating rupturable paths for lift truck fork ingress.

References Cited in the file of this patent

UNITED STATES PATENTS

| | | |
|---|---|---|
| 2,284,385 | Freshwaters | May 26, 1942 |
| 2,571,748 | Newman | Oct. 16, 1951 |
| 2,575,784 | Baumann | Nov. 20, 1951 |
| 2,673,022 | Prossen | Mar. 23, 1954 |
| 2,724,496 | Hollinshead | Nov. 22, 1955 |
| 2,804,204 | Collura | Aug. 27, 1957 |
| 2,818,972 | Claus | Jan. 7, 1958 |